United States Patent [19]

Maccarrone

[11] Patent Number: 5,027,962
[45] Date of Patent: Jul. 2, 1991

[54] MODULAR AND BUILT-UP SYSTEM FOR FURNISHINGS IN GENERAL

[75] Inventor: Paolo Maccarrone, Turin, Italy

[73] Assignee: Blu Italia S.r.l., Turin, Italy

[21] Appl. No.: 380,529

[22] Filed: Jul. 17, 1989

[30] Foreign Application Priority Data

Jul. 19, 1988 [IT] Italy .............................. 53311/88[U]

[51] Int. Cl.⁵ .............................................. A47B 47/00
[52] U.S. Cl. ...................................... 211/191; 211/182
[58] Field of Search ...................... 211/191, 182, 183; 248/68.1, 230, 229, 316.1; 403/391, 389, 396, 172, 170; 256/68, 65

[56] References Cited

U.S. PATENT DOCUMENTS

| | | | |
|---|---|---|---|
| 242,831 | 6/1881 | Lockwood | 256/69 |
| 609,487 | 8/1898 | Winslow | 211/182 |
| 1,705,237 | 3/1929 | Bulman | . |
| 2,841,918 | 7/1958 | Sylwan | 211/182 X |
| 3,604,687 | 9/1971 | Moore | 256/68 |
| 4,597,690 | 7/1986 | Girard | 403/391 |

FOREIGN PATENT DOCUMENTS

| | | |
|---|---|---|
| 1261347 | 4/1961 | France . |
| 2538868 | 7/1984 | France . |
| 2605688 | 4/1988 | France . |

Primary Examiner—Carl D. Friedman
Assistant Examiner—Sarah A. Lechok
Attorney, Agent, or Firm—Young & Thompson

[57] ABSTRACT

A modular and built-up system for furnishings in general comprises vertical rods made of two parallel beams integral to each other at least at their ends and assembled by means of horizontal support members for the containing of goods; the horizontal members are integral to the vertical rods by means of clamps or joints consisting of two identical half shells, substantially circular, drilled in the center; one of the faces of the half shells, the inner face, carries two parallel splines, equispaced from the center, covering the entire length of the half shells and having a section suitable for copying the side surface of the beams of the rods when assembling the two facing half shells on them; the horizontal elements carry drilled flanges for the coupling of the half shells; the connection of the half shells to the rods and of the horizontal members to the half shells is made by a through bolt through the holes.

4 Claims, 10 Drawing Sheets

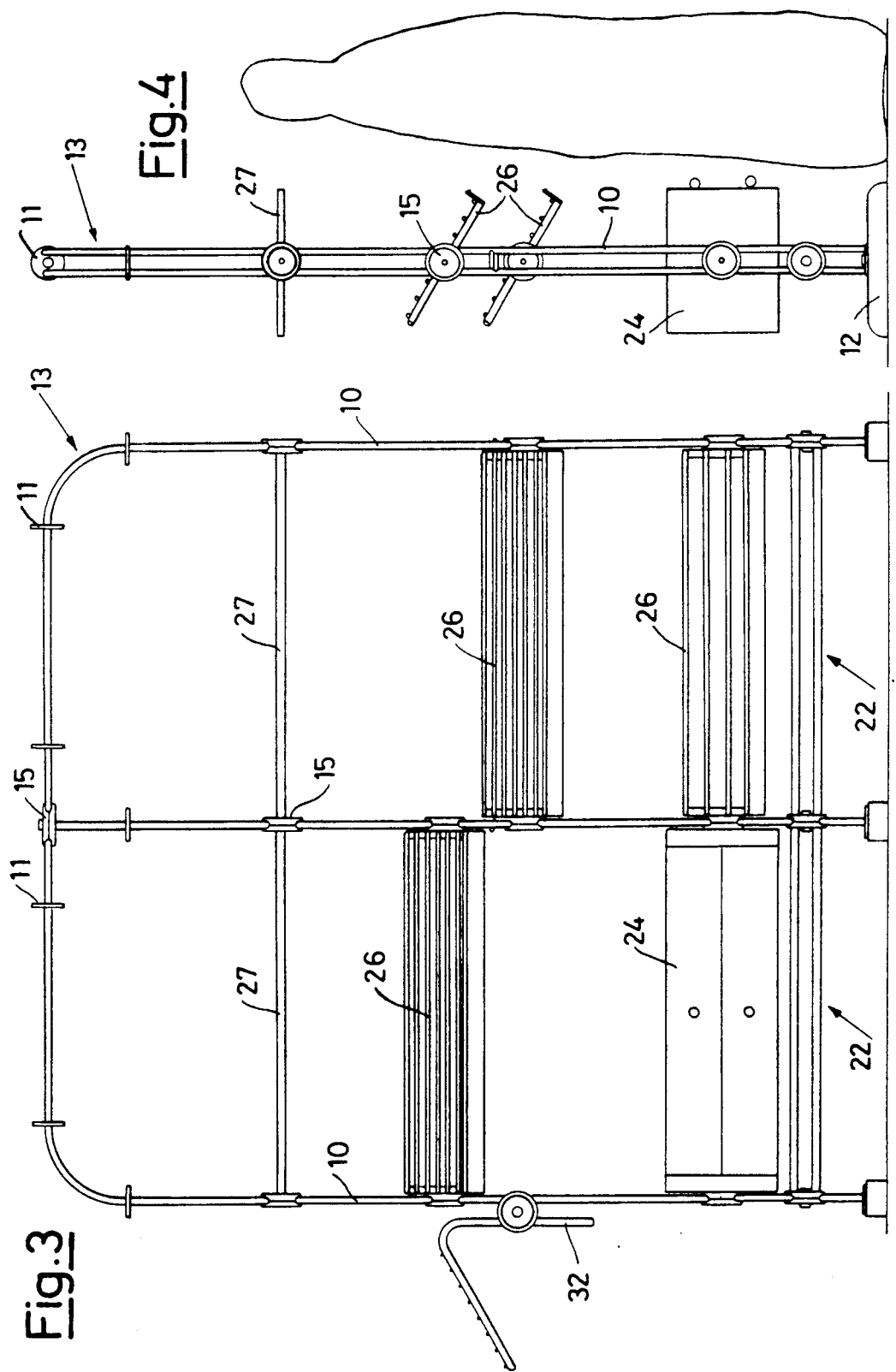

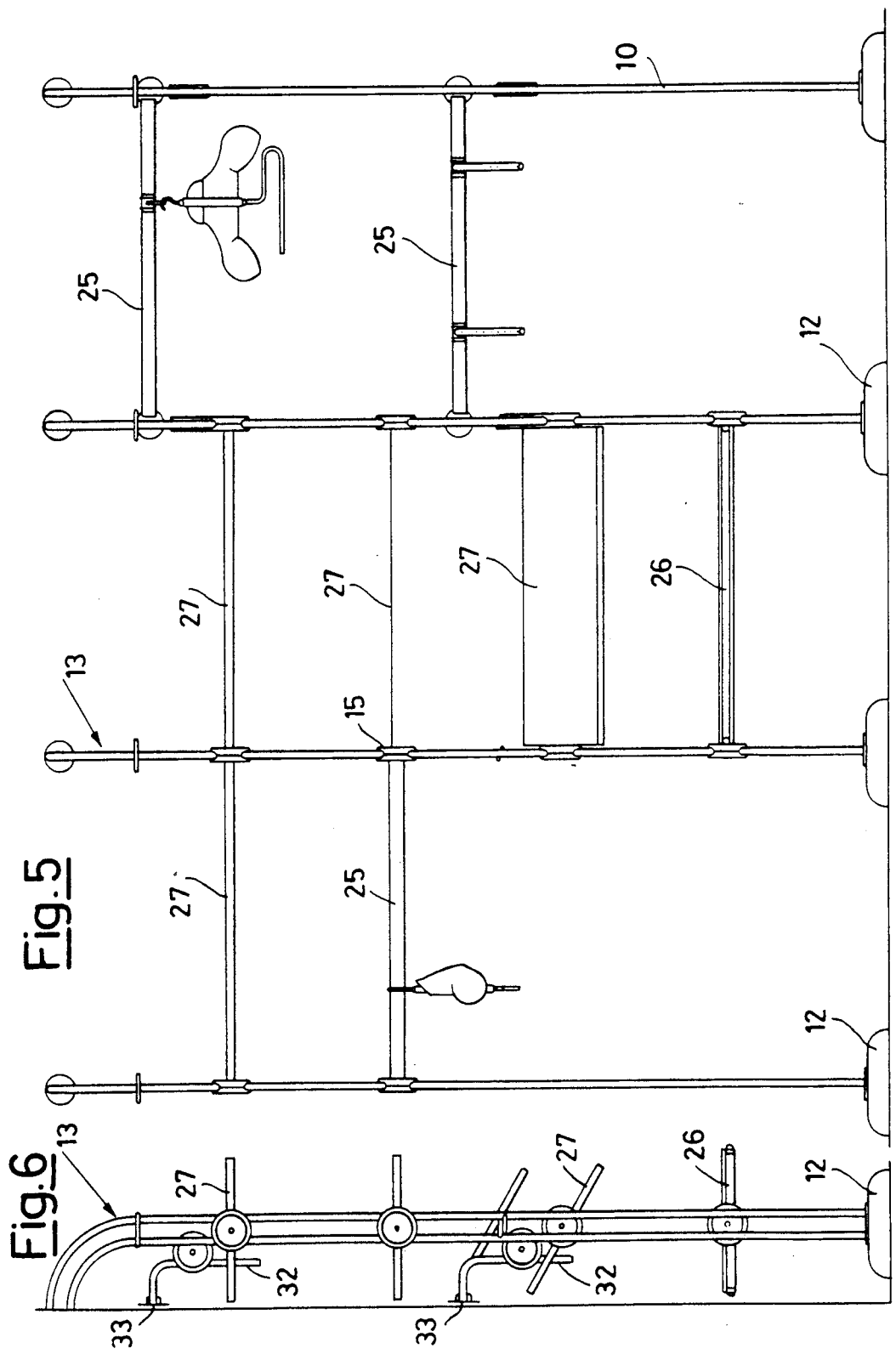

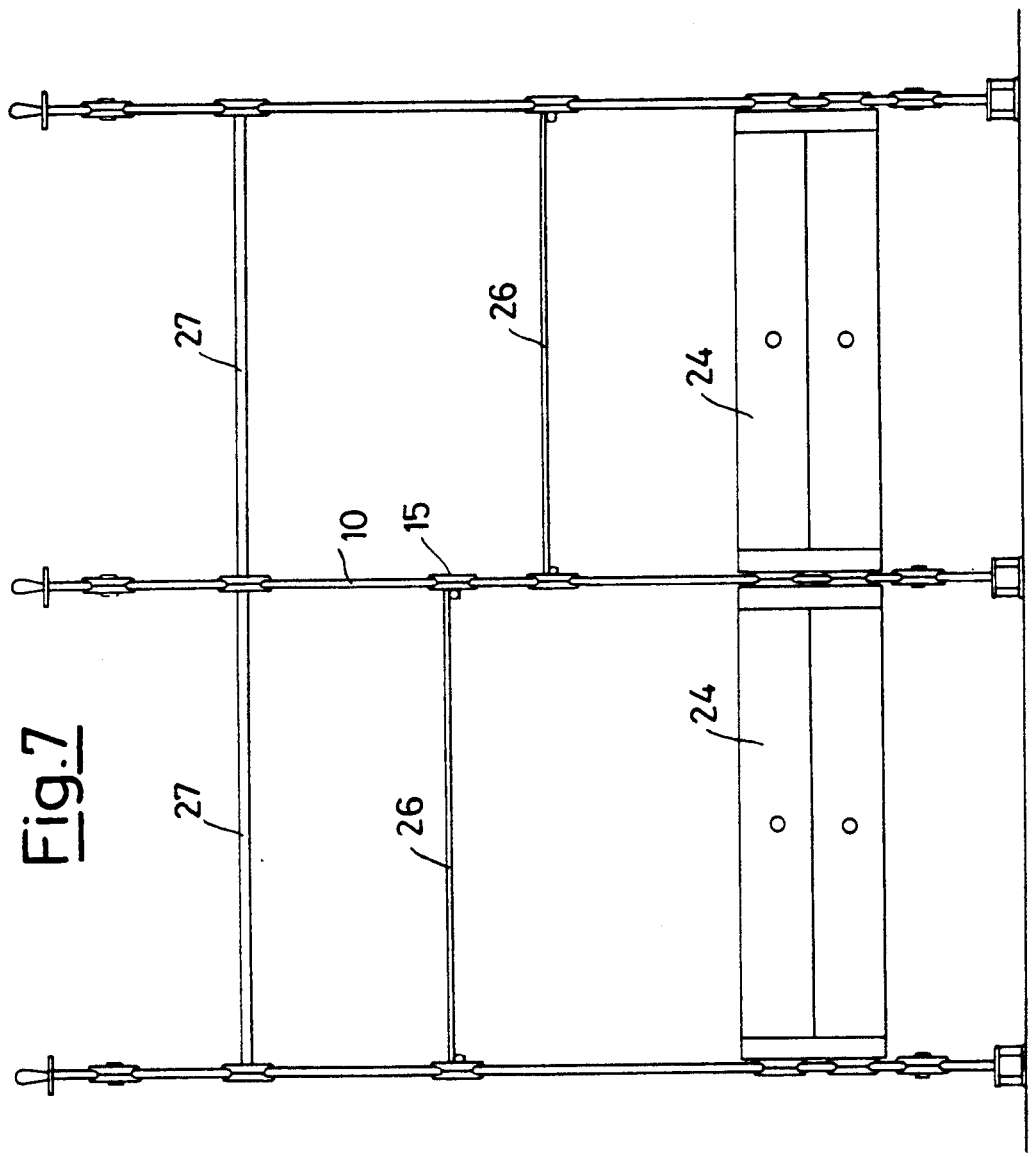
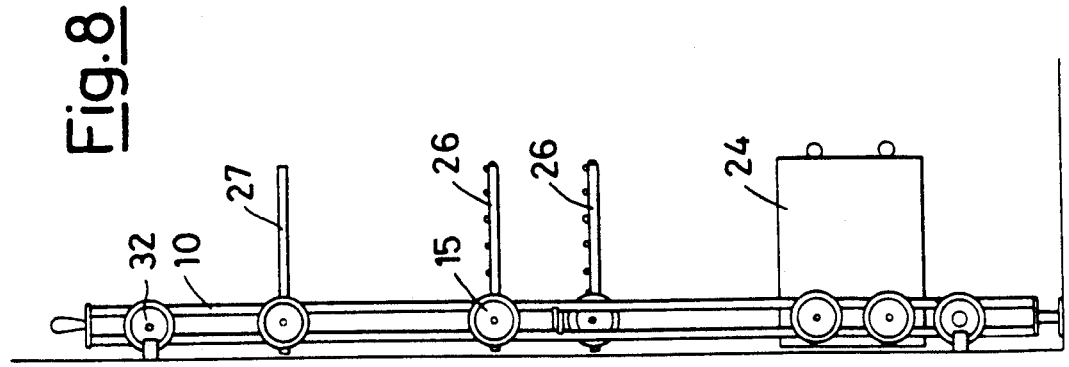

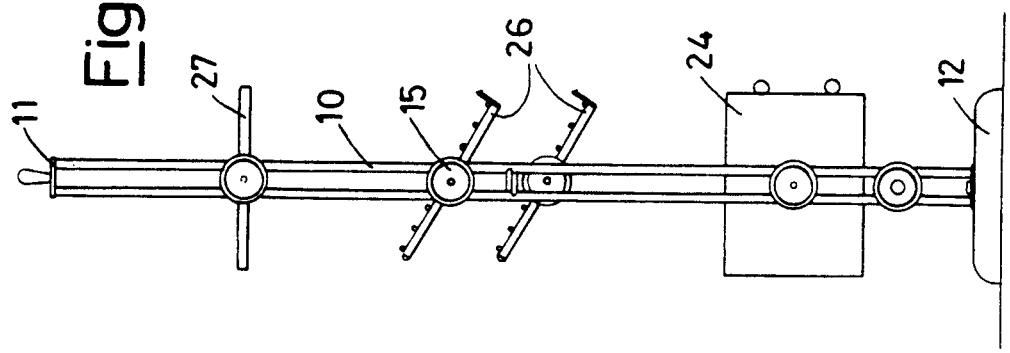
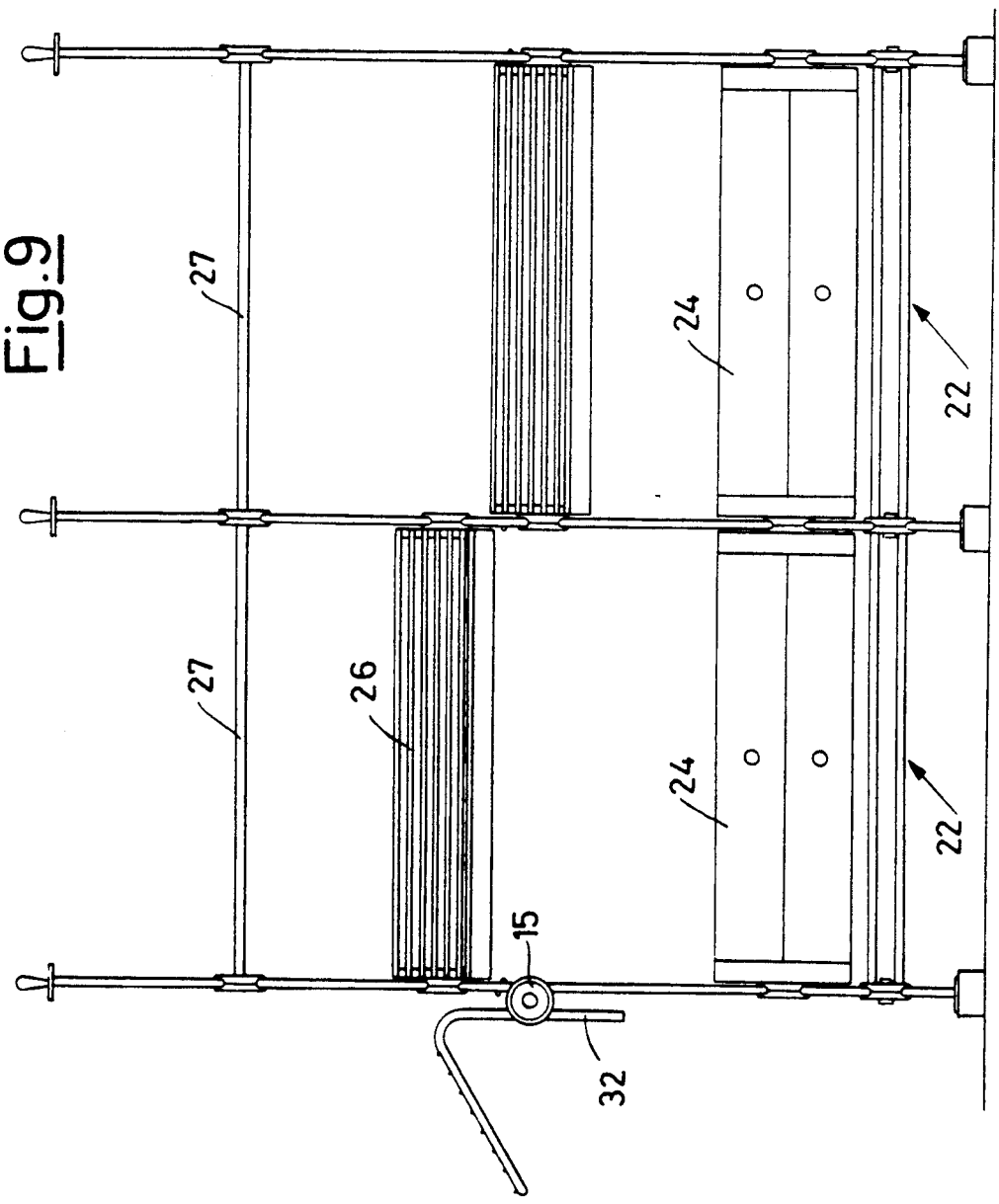

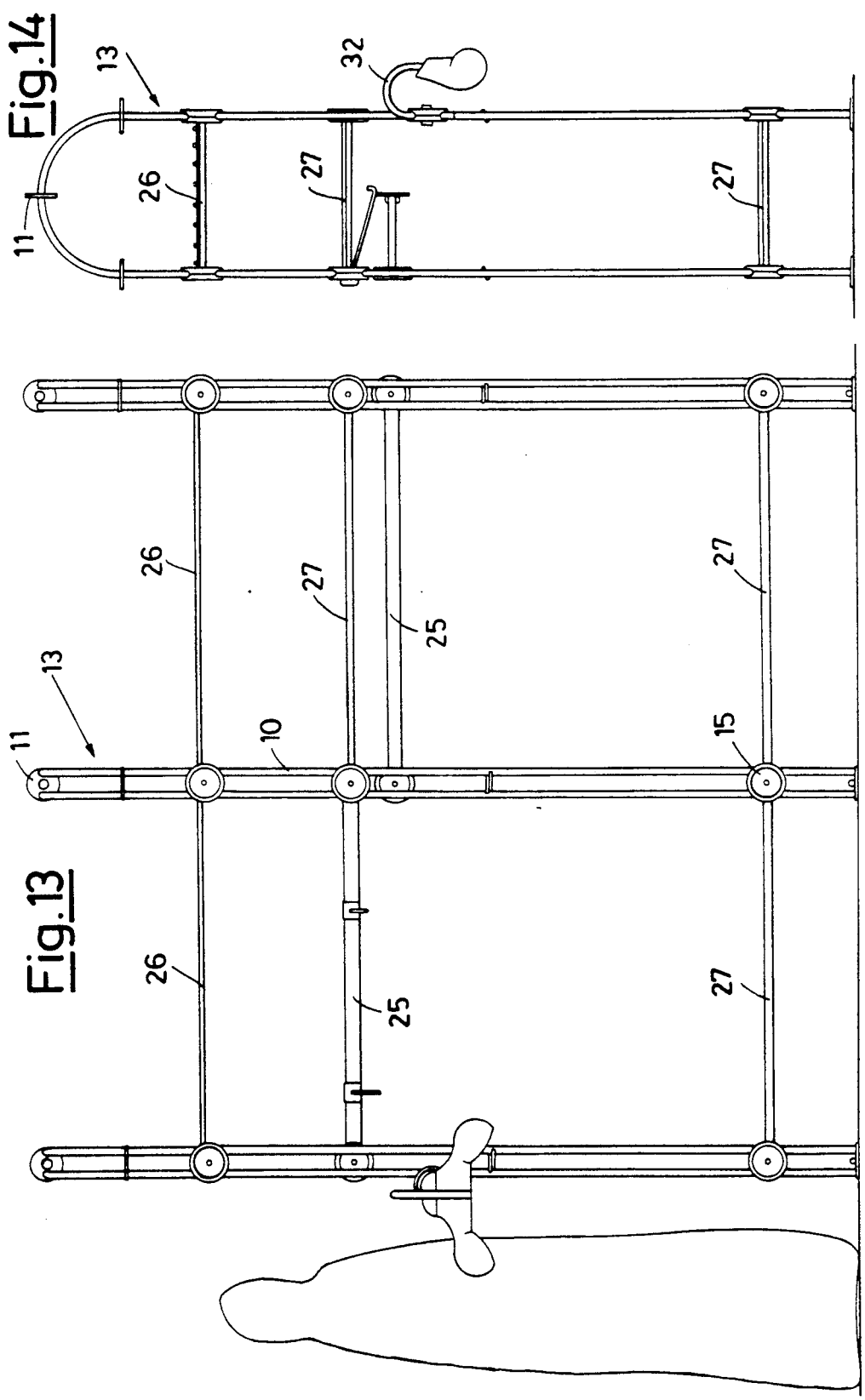

MODULAR AND BUILT-UP SYSTEM FOR FURNISHINGS IN GENERAL

DESCRIPTION

The invention regards a modular and built-up system for furnishings in general.

Several such systems may be found on the market at the moment for the furnishing of houses, stores, exhibitions, stands and offices; these, however, have a somewhat limited modularity. In some cases, the limits are that each vertical rod of these elements consist of two or more parallel beams connected to each other by snake-like joists which preclude the positioning of the shelves and the horizontal supports for the goods at the various heights. On the contrary, in some other cases the vertical rods are made of two or more parallel beams and the connecting joints and support of the horizontal shelves do not offer structure versatility which would be necessary to create several types of embodiments according to different furnishing requirements. Purpose of the invention is to propose an extremely versatile modular built-up system able to solve furnishing problems of stores, exhibitions, stands, apartments and offices; purpose of the invention is also to propose an easy-to-assemble modular built-up system so that the end user may modify the structure according to the utilization appointed for said system.

For these purposes and others which will be better appreciated as the description follows, the invention proposes to realize a modular built-up system for furnishing in general comprising vertical rods made of two parallel beams integral to each other at least at their ends and assembled by means of horizontal support members for containing of goods wherein the horizontal support members are integral to the vertical rods by means of clamps or joints consisting of two identical half shells, substantially circular, drilled in the center; one of the faces of the half shells, said inner face, carries two parallel splines, equispaced from the center, covering the entire length of the half shells and having a section suitable for copying the side surface of the beams of the rods when assembling on them the two facing half shells; the horizontal elements carry drilled flanges for the coupling to the half shells; the connection of the half shells to the rods and of the horizontal members to the half shells is made by a through bolt through said holes.

The system of the invention will now be described with reference to the attached drawings:

FIGS. 1, 3, 5, 7, 9, 11 and 13 are front views of some furnishing embodiments obtained from the system of the invention;

FIGS. 2, 4, 6, 8, 10, 12 and 14 are side views respectively of

Figure 2:
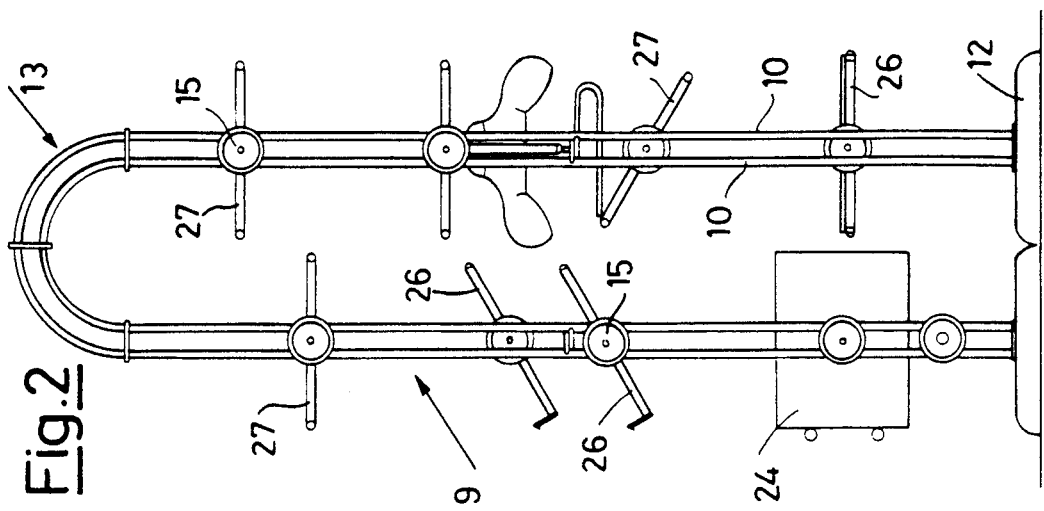
Figure 1:
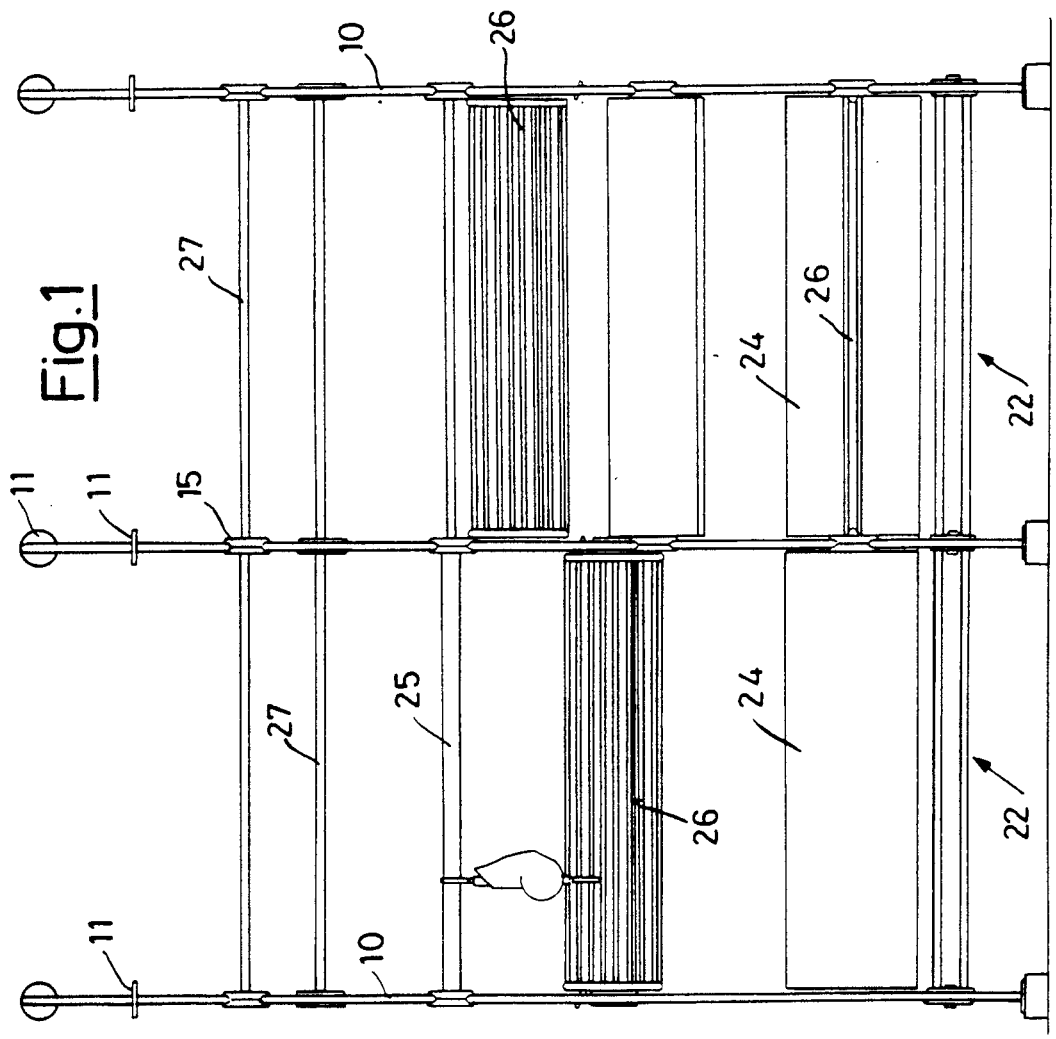
Figure 12:
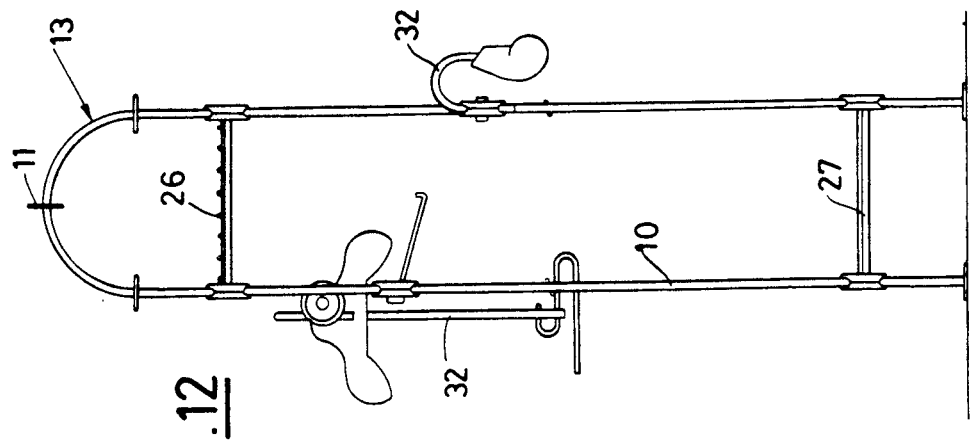
Figure 11:
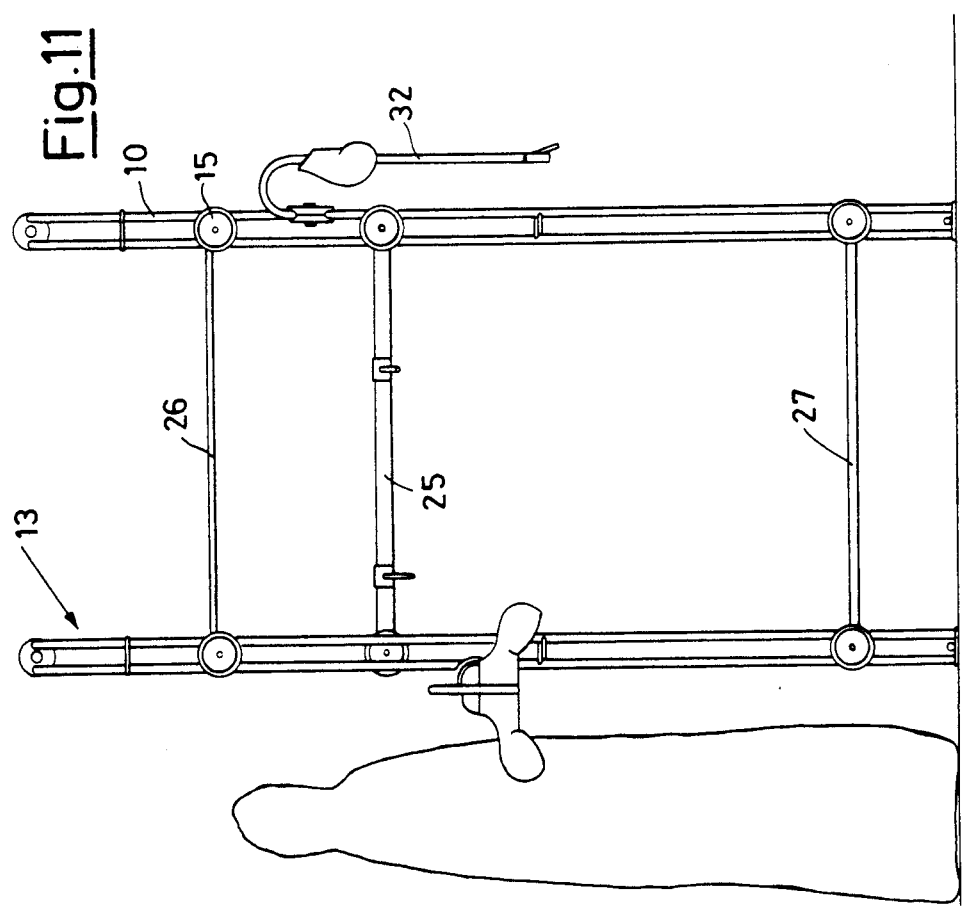
Figure 15:
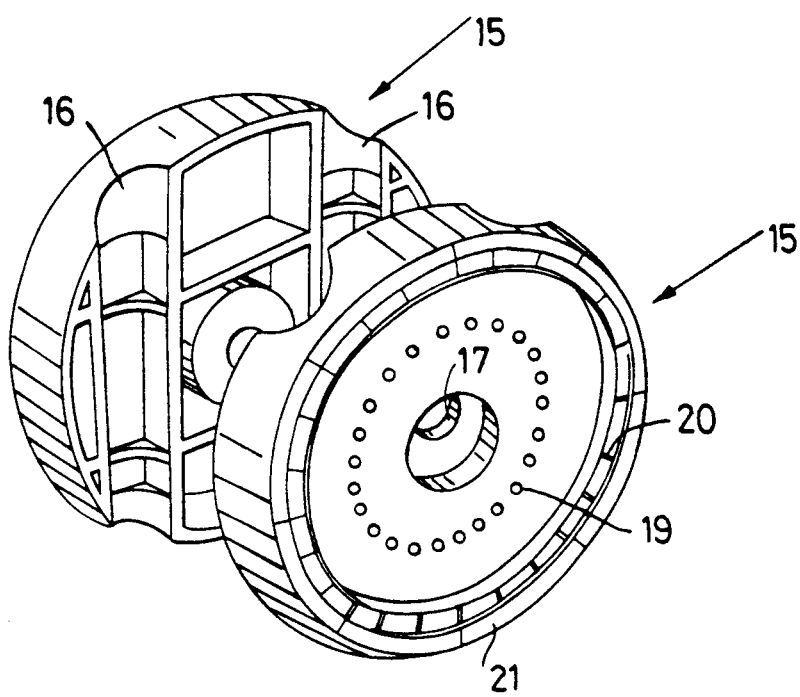
Figure 16:
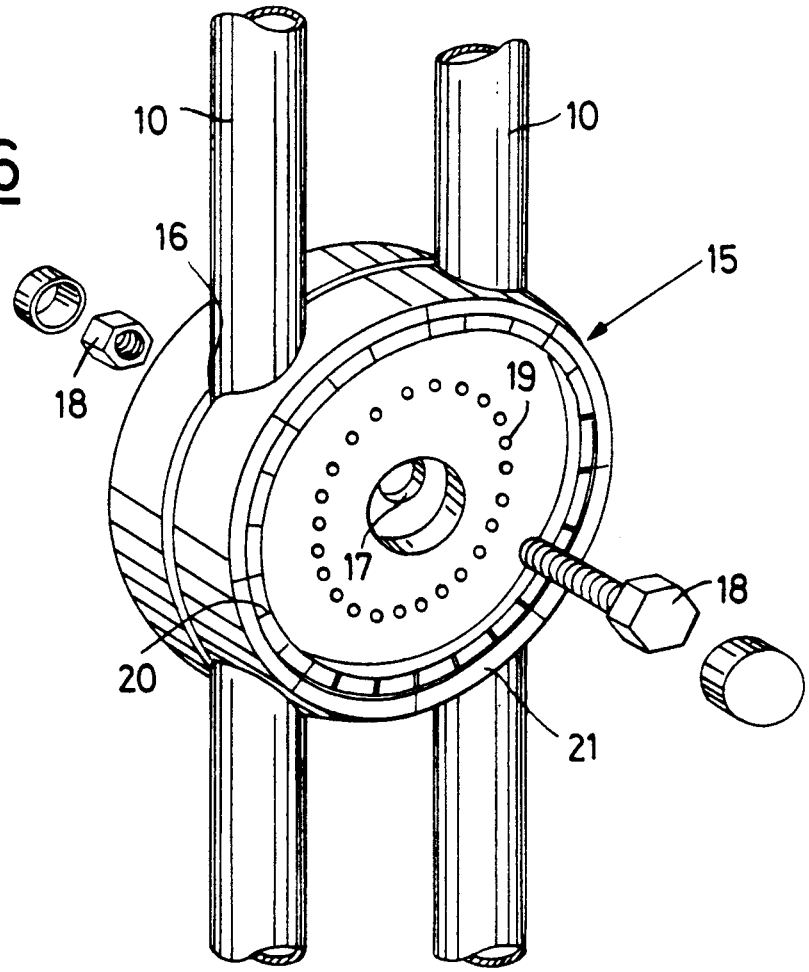
Figure 17:
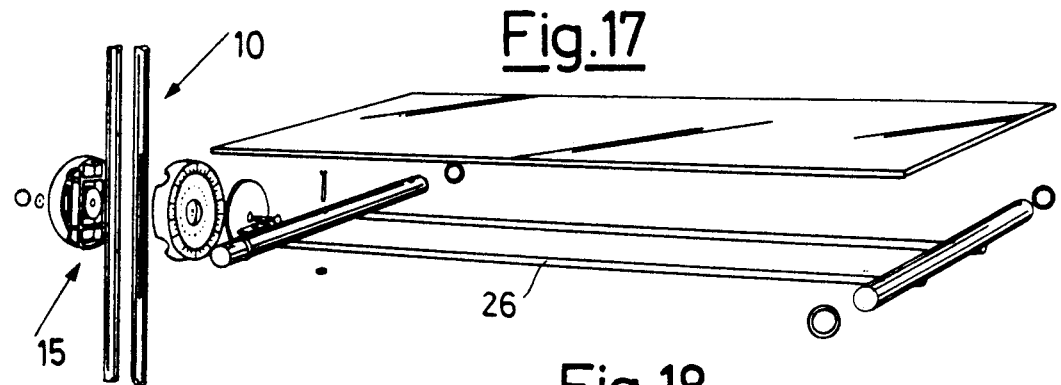
Figure 18:
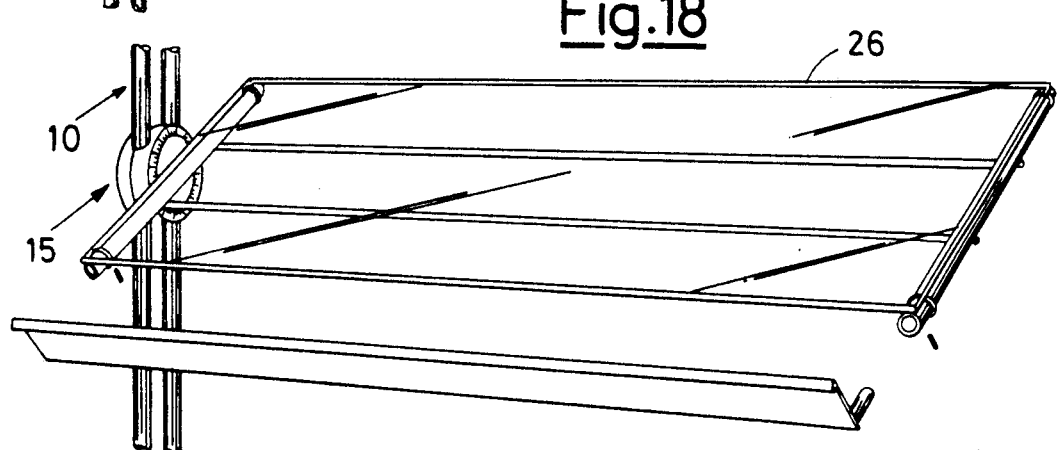
Figure 19:
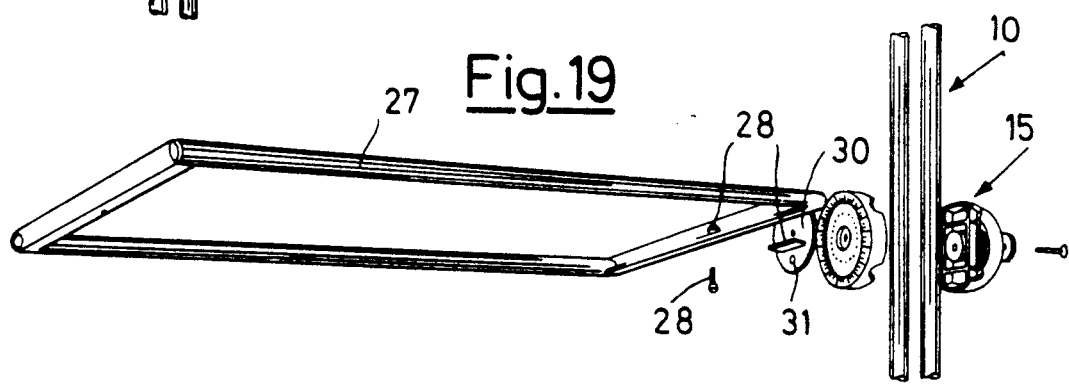
Figure 20:
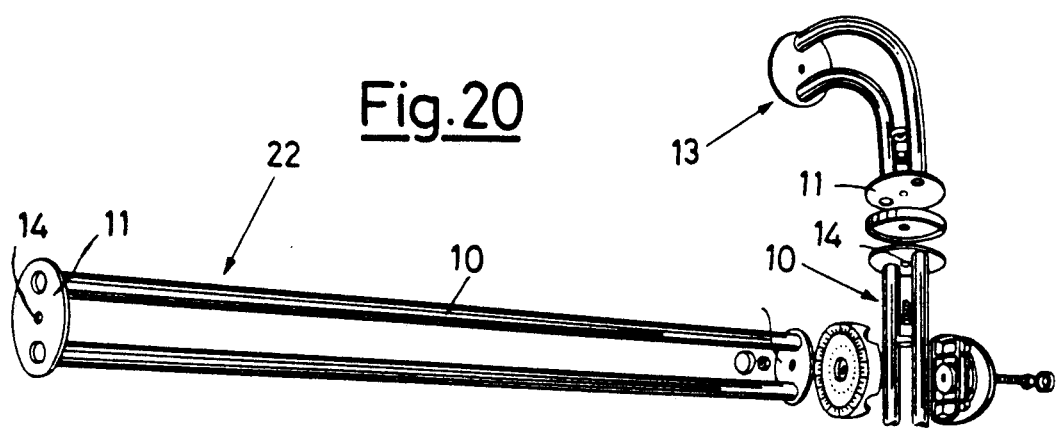
Figure 21:
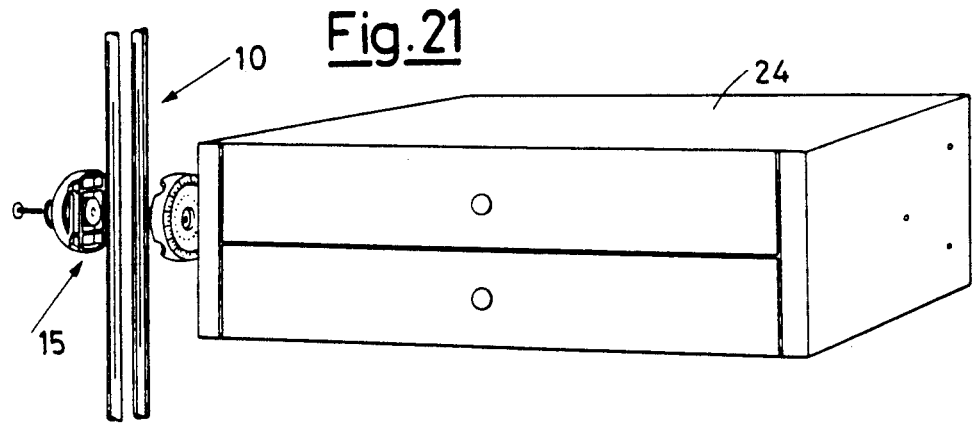
Figure 22:
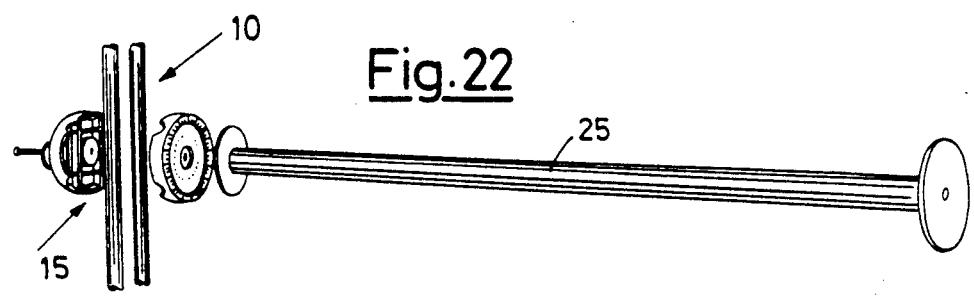
Figure 23:
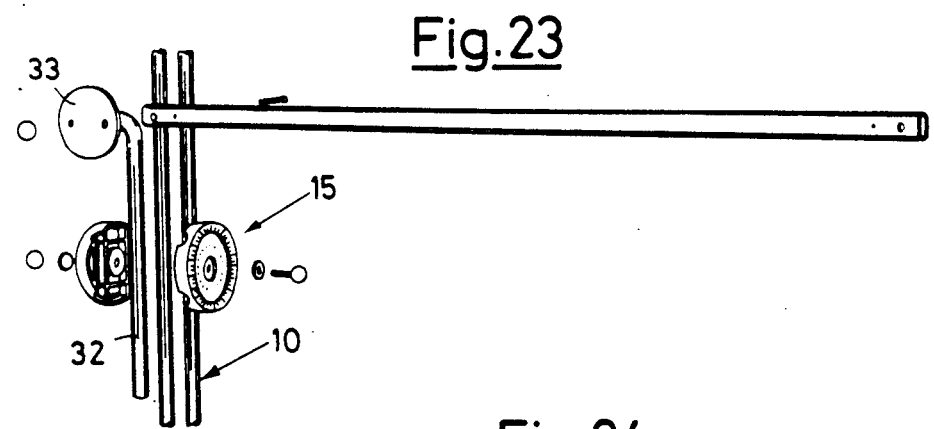
Figure 24:
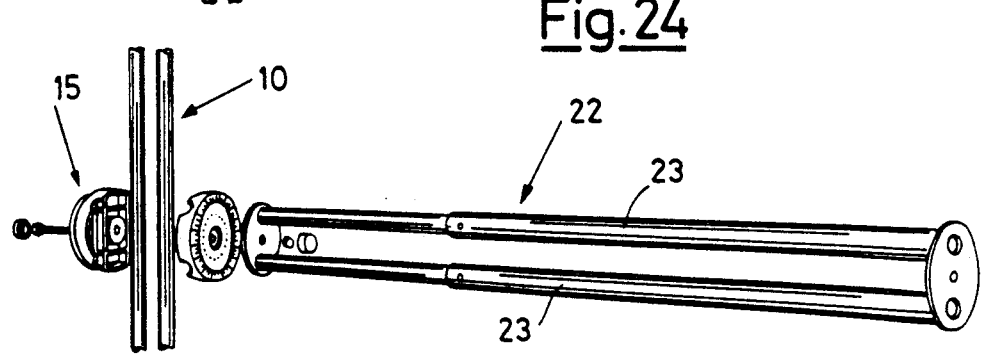

FIGS. 1, 3, 5, 7, 9, 11 and 13;

FIG. 15 illustrates an element of the system;

FIG. 16 illustrates the element of FIG. 15 in the assembly stage;

FIGS. 17-24 are perspective views of some elements of the system.

In the system of the invention each vertical rod 9 consists of two parallel beams 10 of variable length, said beams are connected at their ends by means of circular flanges 11, equipped with a central hole 14 to allow connection by screws, for instance, to a base 12 or to another pair of coplanar beams or to a bent beam element 13; said element also carries flanges 11 at the ends appointed to connect to each other two rods lying on the same side of the system element.

The system will consist of at least two abreast rods between which the various accessories of supporting means intervene.

The supporting means of the goods may be of different types and some of them will be described successively. The elements appointed for the fastening of said supporting means to the rods of the system are joints or clamps (FIGS. 15 and 16) consisting of two identically shaped half shells 15—better if circular but not necessarily so; on one of their faces, the inner faces appointed for the reciprocal coupling of the half shells, they present two parallel splines 16 equispaced from the center of the half shell and crossing the entire length of the half shell along a chord; said splines 16 have a substantially semicircular section so that when coupling the two half shells 15 on the vertical beams 10 of the rods, the respective splines 16 copy the surface of the beams which are pinched between them.

The half shells carry a through hole 17 in the center for the stable coupling of said half shells by means of a bolt 18; along the inner circumference of each half shell a plurality of small equispaced through holes and/or squeezings 19 is found, which have respective notches 20 as landmarks carried on a peripheral crown 21 projecting from the inner face of each half shell 15.

The abreast vertical rods 9 may be interconnected by various elements; for instance, an element may consist of an horizontal rod 22 (FIG. 20) identical to the vertical ones, that is, made of two parallel beams 10, integral by means of circular flanges 11 at their ends. The flanges 11 will have to be embedded during assembly stage into the crown 21 of one of the half shells 15 and rested on the inner face of the crown. The stiff and stable coupling of the horizontal rod 22 to the vertical rod 9 is obtained by means of said through bolt 18 through the hole 14 of the flange 11 and holes 17 of the half shells 15.

Said half shell 15 may be utilized for the connection of horizontal rods 22, telescopic beams 23 (FIG. 24), drawers 24 (FIG. 21), hanging bars 25 (FIG. 22) and various other furnishing elements between abreast rods 9.

The grate type shelves 26 (FIGS. 7 and 18) or sheet shelves 27 (FIG. 19) will be screwed in 28 on small brackets 29 of flanges 30, these latter ones having the features and functions of the flanges 11 of the beams 10.

Flanges 30 will also carry a hole 31 into which a dowel may be screwed.

Before tightening the bolt 18 locking the flange 30 on the half shells 15 and locking said half shells on the beams 10, the flange may be rotated to a desired angle and locked in that position on the half shell 15 screwing the dowel on the squeezing or hole 19 of the half shell thus making stable the inclined position of the shelf 26 or 27. The notches 20 of the crown 21 will work as landmark to determine the places of the holes or squeezings under the flange 30.

The system may also be secured to the wall and for this a bent bar 32 (FIG. 23) may be utilized, equipped with a flange at the end 33 suitable for the securing to the wall.

Two half shells 15 will permit the fastening of the bar 32 two one of the vertical beams 10 at the desired height.

FIG. 1 to 14 illustrate some of the numerous compositions that can be obtained with the system of the invention by means of the above described elements. These Figures are examples of the invention and not limits of same.

I claim:

1. Modular funiture comprising two parallel vertical rods disposed in a common vertical plane and interconnected at least at their ends, horizontal support members for articles, said horizontal support members extending from said rods perpendicular to said plane, clamps for holding said horizontal support members on said rods, said clamps comprising two identical half shells which are substantially circular and drilled in the center, one surface of each half shell having two parallel grooves equidistant from said center extending entirely across the half shells and having a shape and spacing complementary to the shape and spacing of the rods, the horizontal support members having at their ends apertured flanges, and a bolt passing through said apertured flanges and through the centers of said half shells to hold said rods and horizontal support members in assembled relationship.

2. Modular as claimed in claim 1, and recesses and projections on the sides of said half shells opposite said grooves that mate with recesses and projections on said flanges thereby to permit securing said horizontal support members to said rods in any of a plurality of positions of adjustment about a horizontal axis passing through the centers of said half shells.

3. Modular as claimed in claim 1, in which said flanges have transverse brackets to which said horizontal support members are secured.

4. Modular as claimed in claim 1, wherein said rods have a circular section and said grooves have a substantially semi-circular section.

* * * * *